United States Patent [19]

Ikenoya et al.

[11] 4,450,683
[45] May 29, 1984

[54] EXHAUST GAS CLEANING SYSTEM FOR INTERNAL COMBUSTION ENGINES

[75] Inventors: Yasuo Ikenoya, Kawagoe; Yoichi Ishida, Niiza, both of Japan

[73] Assignee: Honda Giken Kogyo Kabushiki Kaisha, Tokyo, Japan

[21] Appl. No.: 409,548

[22] Filed: Aug. 19, 1982

[30] Foreign Application Priority Data

Aug. 24, 1981 [JP] Japan ................... 56-132410

[51] Int. Cl.$^3$ .................. F02B 75/10; F01N 3/22
[52] U.S. Cl. ........................... 60/290; 60/293
[58] Field of Search ............ 60/293, 290, 305, 304

[56] References Cited

U.S. PATENT DOCUMENTS

| | | | |
|---|---|---|---|
| 3,751,915 | 8/1973 | Ranft | 60/293 |
| 3,974,651 | 8/1976 | Nakajima | 60/290 |
| 4,014,169 | 3/1977 | Umino | 60/290 |
| 4,075,834 | 2/1978 | Saito | 60/293 |
| 4,148,189 | 4/1979 | Siki | 60/290 |
| 4,215,542 | 8/1980 | Kobayashi | 60/293 |

Primary Examiner—Douglas Hart
Attorney, Agent, or Firm—Armstrong, Nikaido, Marmelstein & Kubovcik

[57] ABSTRACT

An exhaust gas cleaning system for an internal combustion engine is provided which has an exhaust system including a TWC catalyst. The exhaust gas cleaning system comprises a secondary air supply passage coupled to the exhaust system on the upstream side of the ternary catalyst for supplying secondary air to the exhaust system. A secondary air control valve is positioned in the secondary air supply passage for regulating the flow of secondary air therethrough. The secondary air control valve comprises a unitary valve casing, a valve passage in the valve casing coupled to the secondary air supply passage, and first and second control valves for separately opening and closing the valve passages. The first control valve is closed when the engine is decelerating and the second control valve is closed when the engine is accelerating or operating at high speed, thereby maintaining the TWC catalyst as a reducing atmosphere.

5 Claims, 2 Drawing Figures

EXHAUST GAS CLEANING SYSTEM FOR INTERNAL COMBUSTION ENGINES

BACKGROUND OF THE INVENTION

1. Field of the Invention

This invention relates to an exhaust gas cleaning system for internal combustion engines which permits efficient cleaning of an exhaust gas from an exhaust system for an internal combustion engine and, more particularly, to an exhaust system in which a three-way conversion (TWC) catalyst is provided by supplying secondary air to the exhaust system while controlling the flow rate thereof.

2. Description of the Prior Art

There is a generally-known exhaust gas cleaning system for internal combustion engines in which secondary air is supplied as an exhaust gas cleaning means to an exhaust system to oxidize inflammable, noxious components of the exhaust gas therein, such as HC and CO, and thereby eliminate the oxidized products therefrom. A TWC catalyst is provided in the exhaust system to oxidize or reduce HC, CO and NOx contained in the exhaust gas and thereby eliminate the oxidized or reduced products therefrom.

SUMMARY OF THE INVENTION

A primary object of the present invention is to provide an exhaust gas cleaning system for internal combustion engines which substantially stops the supplying of secondary air to an exhaust system while the engine is decelerating, to thereby prevent the occurrence of after-burning.

Another object of the present invention is to form a substantial reducing atmosphere of a TWC catalyst in the interior of the exhaust system while the engine is accelerating or rotating at a high speed to thereby reduce NOx, which is generated at a high rate while the engine is accelerating or operating at high speed and eliminate the reduced product from the exhaust gas.

It is a further object of the present invention to provide exhaust gas cleaning system with a secondary-air control valve unit which is capable of carrying out the mentioned two types of controlling operations, the control valve being integrally formed and having small dimensions and a small weight.

Another object of the present invention is to improve the durability of an exhaust gas cleaning system to a great extent.

Still another object of the present invention is to provide an exhaust gas cleaning system of the above-mentioned kind which is provided with a secondary-air control valve unit having improved responsive performance and capable of carrying out its controlling operations accurately and reliably, and which permits introducing purified air into the secondary-air control valve unit without using any special air filter, to thereby simplify the construction of the exhaust gas cleaning system.

A further object of the present invention is to provide an exhaust gas cleaning system of the above-mentioned kind in which pipe portions thereof are formed of the smallest possible length, whereby the cleaning system has improved reliability and can be assembled and subjected to maintenance work at high efficiencies.

The above and other objects, as well as advantageous features of the invention, will become apparent from the following description of the preferred embodiment taken in conjunction with the accompanying drawings:

DESCRIPTION OF THE PREFERRED EMBODIMENT

An embodiment of the present invention which is applied to an internal combustion engine for motorcycles will now be described with reference to the drawings.

Figure 1:
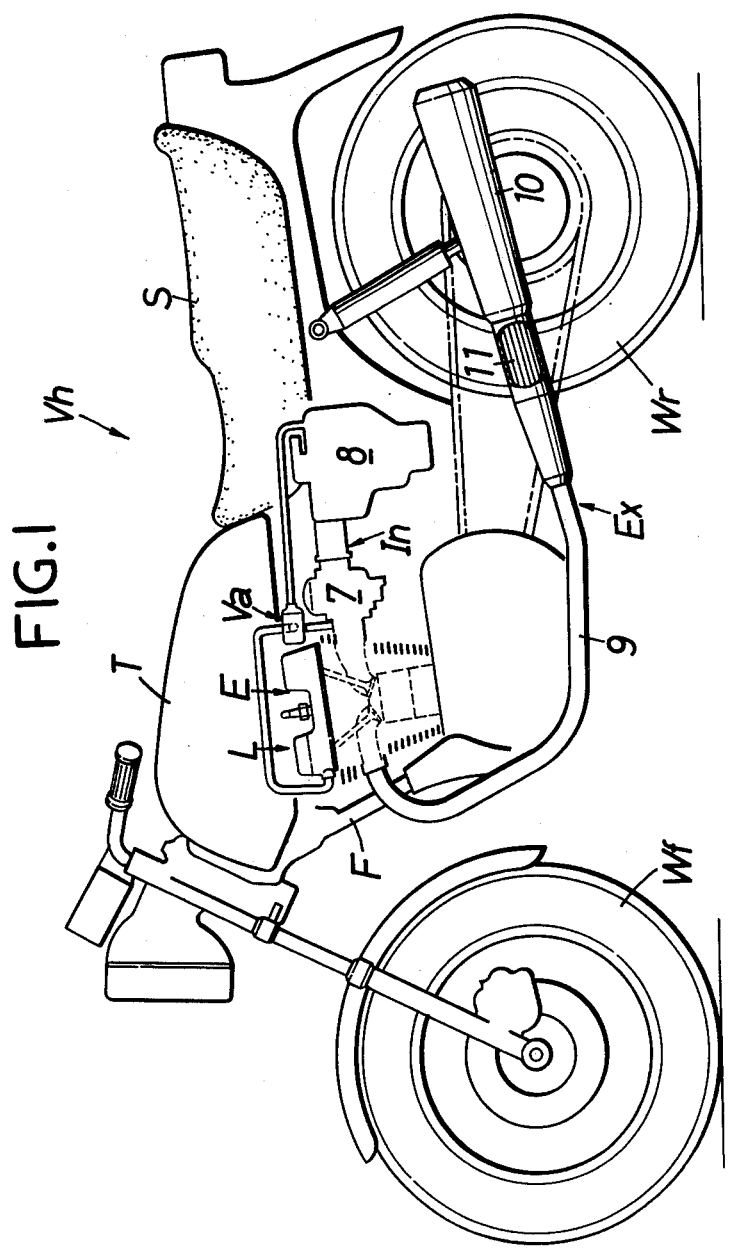
FIG. 1 is a side elevational view of a motorcycle provided with an exhaust gas cleaning system according to the present invention.

Referring to FIG. 1, a fuel tank T and a seat S are supported on upper portions of a frame F of a motorcycle Vh, and front and rear wheels Wf, Wr are suspended from front and rear portions of the frame F. In a space surrounded by the fuel tank T, seat S and front and rear wheels Wf, Wr, an internal combustion engine E is mounted on the frame F in such a manner that the engine E extends laterally.

Figure 2:
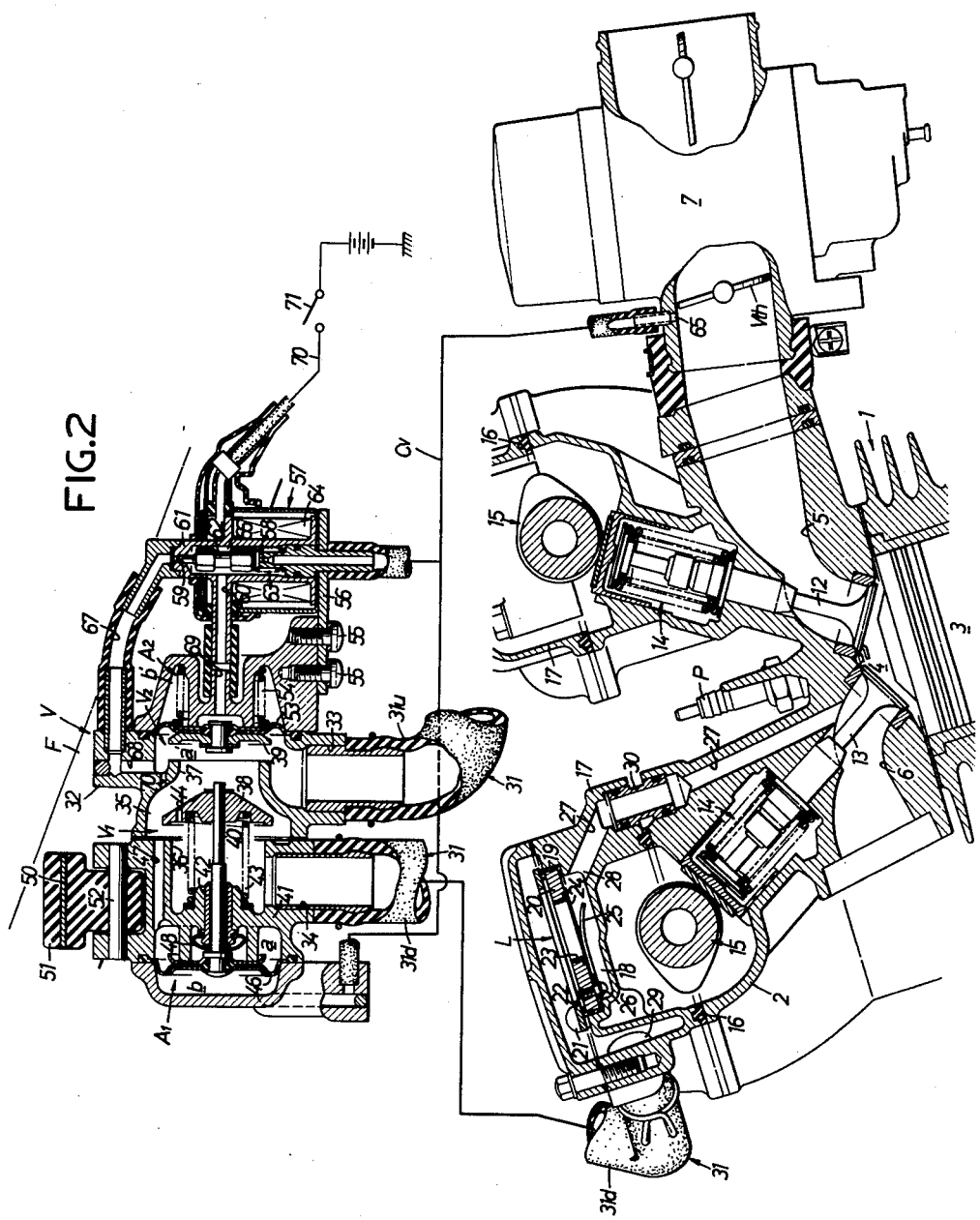
FIG. 2 is a longitudinal sectional view of the exhaust gas cleaning system according to the present invention.

Referring to FIG. 2, a suction port 5, which communicates with a combustion chamber 4 provided above a piston 3, is formed in a rear half portion of a cylinder 2 of an engine body 1 and an exhaust port 6, which is also in communication with the combustion chamber 4, is formed in a front half portion of cylinder head 2. The suction port 5 is opened in a rear surface of the engine body 1 and the exhaust port 6 in a front surface thereof. As shown in FIG. 1, a suction system In including a carburetor 7 and an air cleaner 8 is positioned behind the engine body 1 and is connected to the suction port 5. An exhaust system Ex, including an exhaust pipe 9 and a muffler 10, is coupled to the exhaust port 6. A TWC catalyst 11 for cleaning the exhaust gas is provided at an intermediate portion of the muffler 10. The cylinder head 2 is provided therein as is usually the case, with a cylinder head of an internal combustion engine, with a suction valve 12 and an exhaust valve 13 which are adapted to open and close the suction port 5 and exhaust port 6 which are on the side of the combustion chamber 4. The suction valve 12 and exhaust valve 13 operate by joint action of the valve springs 14 and valve mechanisms 15. The cylinder head 2 is further provided with an ignition plug P at that portion thereof which is between the suction valve 12 and exhaust valve 13.

A head cover 17 is positioned over the exhaust valve 13 in the cylinder head 2 using a packing 16. The head cover 17 has a check valve, i.e., a reed valve L, which is adapted to be operated in response to pulsating pressure of an exhaust gas.

In the head cover 17, a valve chamber 18 is formed in which a reed or check valve 20 is installed via a heat resisting packing 19. The reed valve 20 is fixed via a mounting plate 22 to the head cover 17 with setting screws 21. The reed valve 20 is provided with a bore 23 therein. A reed 24 for opening and closing the bore 23, and a reed stopper 25 for restricting the degree of opening of the reed 24 are fixed to a lower surface of the reed valve 20 with setting screws 26.

A secondary air passage 27 is formed so as to extend through the cylinder head 2 and head cover 17. The secondary air passage 27 is coupled at an upper end thereof to a discharge port 28 of the valve chamber 18 in the reed valve L, and at a lower end thereof to that portion of the exhaust port 6 which is in the vicinity of the exhaust valve 13.

When the cylinder head 2 and the head cover 17 are joined to each other, the secondary air passage 27 extending therethrough is closed air-tightly at an intermediate portion thereof with a connecting pipe 30. The connecting pipe 30 serves also as a guide member when the cylinder head 2 and head cover 17 are joined together.

A secondary air supply passage 21 is coupled between a purification chamber in the air cleaner 8, and inlet port 29 of the reed valve L. The inlet port 29 opens into the valve chamber 18.

When the engine E is operated, vacuum pressure is generated due to the pulsating pressure of an exhaust gas in the exhaust port so that the reed 24 is opened intermittently. Accordingly, the secondary air from the air cleaner 8 is introduced into the exhaust port 6 through the secondary air supply passage 31, reed valve L and the secondary air passage 27.

A secondary air control valve unit V for controlling a flow rate of the secondary air to be supplied to the exhaust port 6 is provided at an intermediate portion of the secondary air supply passage 31. This control valve unit V consists of a first control valve $V_1$, which is closed when the engine E is decelerating or snap-rotated to substantially stop the supply of secondary air to the exhaust system, and a second control valve $V_2$, which is closed when the engine E is rotated at a high speed or accelerating to reduce the flow rate of the secondary air supplied to the exhaust system Ex.

A unitary valve casing 32, in which the first and second control valves $V_1$ and $V_2$ are installed is supported via a rubber mount 51 and a mounting pin 52 on a bracket 50 fixed to the frame F. Inlet and outlet ports 33 and 34 for the secondary air extend parallel to each other and open into the valve casing 32. An upstream passage member 31u, which is connected to the air cleaner 8 (FIG. 1) of the secondary air supply passage 31 is coupled to the inlet port 33, and a downstream passage member 31d, which is connected to the reed valve L of the secondary air supply passage 31, is coupled to the outlet port 34. The valve casing 32 is provided therein with a valve passage 35 in which first and second valve ports 36 and 37 are formed and the inlet and outlet ports 33,34 are coupled to each other through the valve ports 36 and 37.

The first valve port 36 is opened and closed by and with the first control valve $V_1$, and the second valve port 37 by and with the second control valve $V_2$.

The construction of the first control valve $V_1$ will be described: A first valve body 38 for opening and closing the first valve port 36 is provided in the valve passage 35 and a valve rod 40 connected to the valve body 38 is passed through a guide sleeve 42, which is fitted in a wall 41 in the valve casing 32, such that the valve rod 40 can be slid reciprocatingly therethrough. A valve spring 43 is provided between the wall 41 in the valve chamber 35 and the valve body 38. The valve body 38 is urged open by the resilient force of the valve spring 43.

A leakage bore 44 is provided in the first valve body 38. Therefore, even when the first valve port 36 is closed by the first valve body 38, a small amount of secondary air is sent to the exhaust system Ex through the leakage bore 44 and secondary air supply passage 31.

The valve passage 35 is provided therein with a first vacuum-operated unit $A_1$ defined by the wall 41. The vacuum-operated unit $A_1$ has a diaphragm 46 and an atmospheric pressure chamber a and a vacuum chamber b, which are separated by the diaphragm 46. The valve rod 40 projects at one end portion thereof into the first vacuum operated unit $A_1$ and is connected to the diaphragm 46. The atmospheric pressure chamber a is coupled to the upstream passage member 31u via an atmospheric passage 47 and valve passage 35. The vacuum chamber b is coupled via a vacuum circuit Cv to that portion of a suction passage which is on the downstream side of a throttle valve Vth for the carburetor 7 such that the suction vacuum in the suction passage is applied to the vacuum chamber b.

In the atmospheric pressure chamber a, a boot 48 which consists of a flexible material, such as rubber or a synthetic resin, is joined air-tightly at both ends thereof to end portions of the wall 41 and valve rod 40. The atmospheric pressure chamber a and valve passage 35 are shut off from each other by the boot 48 so that the air passing through a clearance between the guide sleeve 42 and valve rod 40 does not flow into the atmospheric pressure chamber a.

The construction of the second control valve $V_2$ will now be described. A second vacuum-operated unit $A_2$ is provided on one side of the valve passage 35 to which the second air supply passage 31 is coupled. The vacuum-operated unit $A_2$ has a diaphragm 53 and an atmospheric pressure chamber a′ and a vacuum chamber b′ which are separated by the diaphragm 53. The atmospheric pressure chamber a′ is constantly coupled to the upstream passage 31u, and is also coupled to the valve passage 35 via the second valve port 37. A second valve body 39 for opening and closing the second valve port 37 is fixed to the surface of the diaphragm 53 which faces the atmospheric pressure chamber a′. In the vacuum chamber b′, a spring 54 urges the diaphragm 53 towards the valve port 37. When the vacuum in the vacuum chamber b′ is increased, the second valve body 39 is moved with the diaphragm 53 from the second valve port 37 against the resilient force of the spring 54 so that the second valve port 37 is opened.

A stay 56 is fixed with setting screws 55 to one side (right side in FIG. 2) of the valve casing 32 and a change-over valve, i.e., a solenoid valve 57, is supported on the stay 56. The solenoid valve 57 has a valve casing 61 having first and second inlet ports 58 and 59 opened at opposite portions thereof, and an outlet port 60 opened between the inlet ports 58 and 59. A valve body 62 is positioned in a valve chamber 66 in the valve casing 61 and is capable of opening and closing the first and second inlet ports 58 and 59, alternately. A valve spring 63 urges the valve body 62 in the direction in which the second inlet port 59 is closed therewith. A solenoid 64 is disposed to surround the valve casing 61 and urge the valve body 62 against the resilient force of the valve spring 63 in the direction in which the second inlet port 59 is opened. The first inlet port 58 is coupled to the vacuum circuit Cv, which is coupled to a vacuum extracting port 65 opened in that portion of the suction passage which is on the downstream side of the throttle valve Vth in the carburetor 7. An atmospheric passage 67 is coupled to the second inlet port 59. The atmospheric passage 67 is coupled at the other end thereof to the atmospheric pressure chamber a′ in the valve casing 32 via an atmospheric air extracting port 68 provided in a wall thereof. The wall of the valve casing 32 is further provided with a leakage bore 72, which permits the valve passage 35 and atmospheric pressure chamber a' to be coupled to each other, and the atmospheric air to flow towards the valve passage 35 even when the second valve port 37 is closed by the second valve body 39.

The outlet port 60 is coupled to the vacuum chamber b' in the second control valve $V_2$ via a passage 69 formed in the valve casing 32.

A switch 71 for operating a vehicle speed sensor for a motorcycle is connected to an intermediate portion of a power source circuit 70 connected to the solenoid 64. The switch 71 is adapted to be closed when the vehicle speed is higher than a predetermined level (for example, 70 km/h).

The operation of the embodiment of the present will now be described.

When the engine E is decelerating, the degree of opening of the throttle valve Vth in the carburetor 7 is low. Accordingly, a high suction vacuum (not less than 450 mmHg), on the downstream side of the throttle valve Vth, works on the air in the vacuum chamber b in the first control valve $V_1$ through the vacuum circuit Cv. As a result, the diaphragm 46 is pulled to be displaced to the left in FIG. 2 to cause the valve port 36 to be closed by the first valve body 38. At this time, an irreducible minimum amount of secondary air is supplied from the leakage bore 44 in the first valve body 38 to the exhaust port 6 through the downstream passage member 31d but the flow rate of this secondary air is so low that only the combustion of unburnt components is promoted thereby. The secondary air is not substantially supplied to the exhaust port. This prevents the occurrence of after-burning. When an air-fuel ratio in the atmosphere of the TWC catalyst 11 comes close to a theoretical air-fuel ratio, the reducing and oxidizing actions of the catalyst 11 take place so that HC, CO and NOx in the exhaust gas are removed.

When the engine E enters into a low-speed operational region, the vacuum on the downstream side of the throttle valve Vth decreases gradually (to, for example, 250 mm-100 mmHg) so that the vacuum in the vacuum chamber b also decreases. Consequently, the first valve body 38 is removed from the first valve port 36 owing to the resilient force of the valve spring 43 to open the first valve port 36. When the engine E is in the above-mentioned operational region, the vehicle speed is low (not more than 70 km/h) and the switch 71 is opened. Accordingly, the second inlet port 59 is closed by the valve body 62 in the solenoid valve 57, and the suction vacuum (250 mm-100 mmHg) on the downstream side of the throttle valve Vth works on the air in the vacuum chamber b' in the second control valve $V_2$ through the vacuum circuit Cv, first inlet port 58 and outlet port 60 to cause the second valve body 39 to move from the second valve port 37 (the valve body 39 is so set that it is moved from the valve port 37 at a vacuum of not less than 95 mmHg) against the resilient force of the valve spring 63. Thus, the second valve port 37 is also kept open.

Therefore, in a low-speed operational region of the engine E, both of the valve ports 36 and 37 in the first and second control valves $V_1$ and $V_2$ are opened and are coupled to the secondary air supply passage 31 and the reed valve L is coupled to the atmosphere via the air cleaner 8 (FIG. 1).

On the other hand, the pulsating pressure of an exhaust gas which is generated during an operation of the engine E is transmitted to the reed valve L through the secondary air passage 27 to cause the valve L to be opened. The purified air from the air cleaner 8 is introduced into the reed valve L through the secondary air supply passage 31 and secondary air control valve unit V which is an opened state. The purified air is then introduced into the exhaust port 6 through the secondary air passage 27.

The secondary air introduced into the exhaust port 6 is mixed in the exhaust gas to oxidize a part of HC and CO contained in the exhaust gas in the exhaust port 6 and exhaust pipe 9. The exhaust gas, in which the secondary air is mixed, is then sent into the muffler to reach the TWC catalyst. As a result, an oxidizing atmosphere of the catalyst is formed which is used as an oxidation catalyst by which mainly CO and HC contained in the exhaust gas are oxidized to be converted into $CO_2$ and $H_2O$.

In a low-speed operational region of the engine E, the suction rate of air in the engine E is low and the degree of combustion of gaseous mixture is comparatively low. Accordingly, the rate of generation of NOx is rather low and the rate of generation of HC and CO is high. However, since the air-fuel ratio can be reduced by supplying secondary air to the TWC catalyst 11 as mentioned above to utilize the resulting mixture as an oxidation catalyst, the HC and CO can be removed efficiently by utilizing the TWC catalyst 11.

When the degree of opening of the throttle valve Vth for the engine E is increased to put the engine E in an operational region of acceleration, the suction vacuum in that portion of the suction passage, which is on the downstream side of the throttle valve Vth, is decreased and the vacuum working on the air in the vacuum chamber b' in the second control valve $V_2$ via the solenoid valve 57 also becomes low (not more than 95 mmHg). Consequently, the diaphragm 53 is displaced to the left in FIG. 2 due to the resilient force of the spring 54 and the second valve port 37 is closed by the second valve body 39.

When the engine enters into a high-speed operational region so that the vehicle speed exceeds a predetermined level (70 km/h), the switch 71 for operating the vehicle sensor is closed and the solenoid 64 in the solenoid valve 57 is actuated. As a result, the valve body 62 is pulled downward in FIG. 2 to close the first inlet port 58 and open the second inlet port 59 simultaneously. Accordingly, the atmospheric air in the atmospheric pressure chamber a' flows into the vacuum chamber b' in the second control valve $V_2$ through the atmospheric air extracting port 68, atmospheric air passage 67 and solenoid valve 57 and the second valve body 39 is displaced to the left in FIG. 2 by the spring 54 and the diaphragm 53 to close the second valve port 37. In this case, the secondary air supply passage 31 is also shut off. At this time, the purified atmospheric air, which has flowed from the air cleaner 8 in the suction system In into the atmospheric air pressure chamber a' via the upstream passage member 31u enters the vacuum chamber b'. Therefore, it is not necessary that an air cleaner be provided additionally.

Thus, in both the acceleration operational region and high-speed operational region of the engine E, the second valve port 37 in the second control valve $V_2$ is closed by the second valve body 39 so that the secondary air is not supplied at a high rate into the exhaust system. Namely, the secondary air flows at a required minimal rate from the leakage bore 72 alone into the downstream passage 31d through the first valve port 36 to be supplied into the exhaust port 6.

In the acceleration and high-speed operational regions of the engine E, the secondary air is not substantially supplied to the exhaust system Ex as mentioned above, to thereby form a reducing atmosphere of the TWC catalyst 11. Thus, NOx generated at a high rate mainly in these operational regions of the engine E is reduced to $N_2$ and $O_2$, innoxious substances, which are discharged to the outside.

According to the present invention described above, a secondary air control valve unit is provided in a secondary air supply passage, which is coupled to that portion of the exhaust system which is on the upstream side of a TWC catalyst. The control valve unit includes a unitary valve casing in which a valve passage is coupled to the secondary air supply passage and first and second control valves separately control the valve passage. The first control valve is closed when the engine is decelerating to substantially stop the supply of secondary air to the exhaust system. The second control valve is closed when the engine is accelerating or operated at a high speed to reduce to a great extent the flow rate of the secondary air to the exhaust system and thereby keep the TWC catalyst in the form of a reducing atmosphere. Therefore, the present invention can prevent the secondary air from being excessively supplied while the engine is decelerating so that after-burning does not occur. Furthermore, NOx, which is generated at a high rate while the engine is accelerating or rotated at a high speed, can be reduced and removed effectively. In addition, the secondary air control valve unit, which is capable of carrying out two types of operations mentioned above, is integrally formed. This allows the number of parts to be minimized and the elimination of a pipe for connecting the first and second control valves together. Consequently, the exhaust gas cleaning system can be of small dimensions and weight and also operated very reliably. This exhaust gas cleaning system can be applied very effectively, especially to a motorcycle, which has only a limited space for installing the system therein and which requires the system to be mounted in such a manner that the system is exposed to the outside.

Since the first control valve for opening and closing a valve passage in a valve casing and the second control valve, which is on the upstream side of the first control valve for opening and closing the same valve passage, are provided in series, a high vacuum (450 mmHg) occurring in some cases in the secondary air supply passage while the engine is decelerating is not applied to the second control valve. Therefore, the second control valve is not opened and closed uselessly and repeatedly while the engine is decelerating. Accordingly, the durability of the second control valve is not lost.

First and second vacuum-operated units for opening and closing the first and second control valves, respectively, are connected thereto and vacuum chambers in these vacuum-operated units and that portion of a suction passage for the engine which is on the downstream side of a throttle valve are coupled to each other via a vacuum circuit. The vacuum circuit is provided with a change-over valve which consists of a solenoid valve and which is adapted to selectively couple the vacuum chamber in the second vacuum-operated unit with the suction passage or atmospheric air. The change-over valve is unitarily joined to the valve casing via a stay. This allows a connecting pipe, which consists of a rubber pipe, by which the second vacuum-operated unit in the second control valve and change-over valve are connected together, to be formed to the smallest possible length. Owing to these advantages and the advantages of the second control valve and change-over valve, which are integrally formed, the connecting pipe is not dislocated even when a disturbance occurs. This permits the reliability of the exhaust gas cleaning system to be improved to a great extent. The change-over valve, which is joined to the valve casing via the stay, does not require any other means for connection to the frame of the vehicle. Accordingly, the exhaust gas cleaning system can be assembled and subjected to maintenance work with an improved efficiency, simplified in construction, miniaturized and manufactured at a low cost. Furthermore, since at atmospheric pressure chamber in the second vacuum-operated unit is constantly coupled to the secondary air supply passage which is coupled to an air cleaner in the suction system for the engine, it is not necessary to provide an additional air cleaner. This also serves to simplify the construction of the exhaust gas cleaning system and reduce a total manufacturing cost thereof greatly.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims rather than the foregoing description and all changes which come within the meaning and range of equivalency of the claims are, therefore, to be embraced therein.

What is claimed:

1. An exhaust gas cleaning system for an internal combustion engine having an exhaust system including a TWC catalyst, said exhaust gas cleaning system comprising:
   (a) a secondary air supply passage means coupled to said exhaust system on the upstream side of said TWC catalyst for supplying secondary air to said exhaust system;
   (b) a secondary air control valve means positioned in said secondary air supply passage means for regulating the flow of secondary air therethrough, said secondary air control valve means comprising:
   (i) a unitary valve casing;
   (ii) a valve passage means in said valve casing coupled to said secondary air supply passage means;
   (iii) first and second control valve means for separately opening and closing said valve passage means, said first control valve means being closed when said engine is decelerating and said second control valve means being closed when said engine is accelerating or operating at a high speed, thereby maintaining said TWC catalyst as a reducing atmosphere.

2. An exhaust gas cleaning system according to claim 1 wherein said first and second control valve means are in series in said valve passage means, said second control valve means being positioned on the upstream side of said first control valve means.

3. An exhaust gas cleaning system according to claim 1 or 2 wherein said secondary air control valve means further includes a first vacuum-operated means connected to said first control valve means and having a first vacuum chamber, a second vacuum-operated means connected to said second control valve means and having a second vacuum chamber, a vacuum circuit coupling said first and second vacuum chambers to a suction passage of said engine on the downstream side of an engine throttle valve and a change-over valve means connected to said vacuum circuit and adapted to selectively coupled said vacuum chamber in said second vacuum-operated means with said suction passage or the atmospheric air.

4. An exhaust gas cleaning system according to claim 3 wherein said second vacuum-operated means includes an atmospheric pressure chamber coupled to said valve passage means on the upstream side of said second control valve means, said vacuum passage being coupled to said atmospheric pressure chamber by said change-over valve means.

5. An exhaust gas cleaning system according to claim 4 wherein said change-over valve means comprises a solenoid valve.

* * * * *